United States Patent
Gao et al.

(10) Patent No.: US 11,025,183 B2
(45) Date of Patent: Jun. 1, 2021

(54) INDEPENDENT-SPEED-VARIABLE-FREQUENCY-GENERATOR-BASED CONSTANT FREQUENCY AND NARROW-BAND VARIABLE FREQUENCY POWER SYSTEMS AND METHODS

(71) Applicant: The Boeing Company, Chicago, IL (US)

(72) Inventors: Lijun Gao, Renton, WA (US); Shengyi Liu, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/590,134

(22) Filed: Oct. 1, 2019

(65) Prior Publication Data

US 2021/0099117 A1    Apr. 1, 2021

(51) Int. Cl.
*H02P 9/02*  (2006.01)
*B64D 33/00*  (2006.01)

(52) U.S. Cl.
CPC .............. *H02P 9/02* (2013.01); *B64D 33/00* (2013.01)

(58) Field of Classification Search
CPC .................................. H02P 9/02; B64D 33/00
See application file for complete search history.

(56) References Cited

U.S. PATENT DOCUMENTS

| | | | | |
|---|---|---|---|---|
| 2,995,696 A | * | 8/1961 | Stratton | .................... H02P 9/42 322/32 |
| 3,070,740 A | * | 12/1962 | Stratton | ................. H02K 19/38 322/32 |

* cited by examiner

*Primary Examiner* — Robert L Deberadinis
(74) *Attorney, Agent, or Firm* — Parsons Behle & Latimer

(57) ABSTRACT

A system may include an independent speed variable frequency (ISVF) generator configured to convert torque from a shaft to an AC power signal. The ISVF generator may have one or more pole pairs with an equivalent shaft frequency equaling a shaft frequency multiplied by the number of pole pairs. A generator control unit may set a generator output frequency of the ISVF generator equal to a lower frequency limit of an AC bus when the equivalent shaft frequency is less than the lower frequency limit, set the generator output frequency of the ISVF generator equal to an upper frequency limit of the AC bus when the equivalent shaft frequency is greater than the upper frequency limit, and set the generator output frequency of the ISVF generator equal to the equivalent shaft frequency when the equivalent shaft frequency is between the lower frequency limit and the upper frequency limit.

20 Claims, 5 Drawing Sheets

INDEPENDENT-SPEED-VARIABLE-FREQUENCY-GENERATOR-BASED CONSTANT FREQUENCY AND NARROW-BAND VARIABLE FREQUENCY POWER SYSTEMS AND METHODS

FIELD OF THE DISCLOSURE

This disclosure is generally related to the field of power distribution and, in particular, to independent speed variable frequency (ISVF) generator-based constant frequency and narrow-band power distribution.

BACKGROUND

Induction generators may be used in a power distribution system, such as in aircrafts and other vehicles, to provide an alternating current (AC) power signal for use by various AC loads. The AC loads typically have power frequency requirements that limit the AC power signal to a constant frequency or to a frequency band that is narrower than a typical operational frequency band of a prime mover, such as an engine.

In a typical power distribution system, in order to achieve a constant generator output frequency, a constant speed drive (or some other type of variable speed transmission) may be positioned between the prime mover and a shaft of the generator. Constant speed drives may be complex, heavy, and/or bulky. As such, they may be inappropriate for some applications, particularly with respect to aircraft applications. Other disadvantages may exist.

SUMMARY

Disclosed herein are systems and methods that may overcome one or more of the disadvantages of typical power distribution systems. In an example, a system includes a prime mover configured to rotate a shaft. The system further includes an ISVF generator configured to convert torque from the shaft to an AC power signal, where the ISVF generator has one or more pole pairs, and where an equivalent shaft frequency equals a shaft frequency of the shaft multiplied by a number of the pole pairs. The system includes an AC bus having a lower frequency limit and an upper frequency limit. The system further includes a generator control unit configured to set a generator output frequency of the ISVF generator equal to the lower frequency limit when the equivalent shaft frequency is less than the lower frequency limit, to set the generator output frequency of the ISVF generator equal to the upper frequency limit when the equivalent shaft frequency is greater than the upper frequency limit, and to set the generator output frequency of the ISVF generator equal to the equivalent shaft frequency when the equivalent shaft frequency is greater than or equal to the lower frequency limit and less than or equal to the upper frequency limit.

In some examples, the generator control unit is configured to generate an excitation signal to control the ISVF generator, where an equivalent excitation frequency equals an excitation frequency of the excitation signal multiplied by the number of pole pairs. In such an example, setting the generator output frequency equal to the lower frequency limit includes setting the equivalent excitation frequency to a difference of the lower frequency limit and the equivalent shaft frequency, setting the generator output frequency equal to the upper frequency limit includes setting the equivalent excitation frequency of the excitation signal equal to a difference of the upper frequency limit and the equivalent shaft frequency, and setting the generator output frequency equal to the equivalent shaft frequency includes setting the equivalent excitation frequency of the excitation signal to zero.

In some examples, the system includes a coupler positioned between the prime mover and the shaft and configured to convert a second torque associated with the prime mover to the torque associated with the shaft. In some examples, the coupler includes a fixed ratio gear coupling, a belt, or a combination thereof. In some examples, the prime mover is configured to rotate the shaft without any constant speed drive device coupled therebetween. In some examples, the system includes a set of AC loads electrically connected to the AC bus, where the lower frequency limit and the upper frequency limit are determined at least partially based on operational requirements of the set of AC loads. In some examples, the system may include an alternating-current-direct-current (AC/DC) converter electrically connected to the AC bus and a direct current (DC) bus electrically connected to the AC/DC converter, where the AC/DC converter is configured to convert the AC power signal on the AC bus to a DC power signal on the DC bus. In some examples, the prime mover is an aircraft engine.

In an example, a method includes rotating a shaft using a prime mover. The method further includes converting torque from the shaft to an AC power signal using an ISVF generator, where the ISVF generator has one or more pole pairs, and where an equivalent shaft frequency equals a shaft frequency of the shaft multiplied by a number of the pole pairs. The method further includes applying the AC power signal to an AC bus having a lower frequency limit and an upper frequency limit. The method also includes setting a generator output frequency of the ISVF generator equal to the lower frequency limit when the equivalent shaft frequency is less than the lower frequency limit. The method includes setting the generator output frequency of the ISVF generator equal to the upper frequency limit when the equivalent shaft frequency is greater than the upper frequency limit. The method further includes setting the generator output frequency of the ISVF generator equal to the equivalent shaft frequency when the equivalent shaft frequency is between the lower frequency limit and the upper frequency limit.

In some examples, the method includes generating an excitation signal to control the ISVF generator, where an equivalent excitation frequency equals an excitation frequency of the excitation signal multiplied by the number of pole pairs, where setting the generator output frequency equal to the lower frequency limit comprises setting the equivalent excitation frequency to a difference of the lower frequency limit and the equivalent shaft frequency, where setting the generator output frequency equal to the upper frequency limit comprises setting the equivalent excitation frequency of the excitation signal equal to a difference of the upper frequency limit and the equivalent shaft frequency, and where setting the generator output frequency equal to the equivalent shaft frequency comprises setting the equivalent excitation frequency of the excitation signal to zero.

In some examples, the method includes converting second torque associated with the prime mover to the torque associated with the shaft using a coupler. In some examples, the coupler includes a fixed ratio gear coupling, a belt, or a combination thereof. In some examples, rotating the shaft is performed without any constant speed drive device coupled between the shaft and the prime mover. In some examples, an AC/DC converter is electrically connected to the AC bus, and where a DC bus is electrically connected to the AC/DC converter. In these examples, the method may include converting, at the AC/DC converter, the AC power signal on the AC bus to a DC power signal on the DC bus.

In an example, a system includes a prime mover configured to rotate a shaft. The system further includes an ISVF generator configured to convert torque from the shaft to an AC power signal, where the ISVF generator has one or more pole pairs, and where an equivalent shaft frequency equals a shaft frequency of the shaft multiplied by a number of the pole pairs. The system further includes an AC bus and a generator control unit configured to generate an excitation signal to control the ISVF generator, where an equivalent excitation frequency equals an excitation frequency of the excitation signal multiplied by the number of pole pairs, and where the generator control unit maintains a constant generator output frequency by setting the equivalent excitation frequency equal to a difference between the constant generator output frequency and the equivalent shaft frequency.

In some examples, the system includes a coupler positioned between the prime mover and the shaft and configured to convert second torque associated with the prime mover to the torque associated with the shaft, where the coupler includes a fixed ratio gear coupling, a belt, or a combination thereof. In some examples, the prime mover is configured to rotate the shaft without any constant speed drive device coupled therebetween. In some examples, the system includes a set of AC loads electrically connected to the AC bus, where the constant generator output frequency is determined at least partially based on operational requirements of the set of AC loads. In some examples, the system includes an AC/DC converter electrically connected to the AC bus, and a DC bus electrically connected to the AC/DC converter, where the AC/DC converter is configured to convert the AC power signal on the AC bus to a DC power signal on the DC bus.

Figure 1:
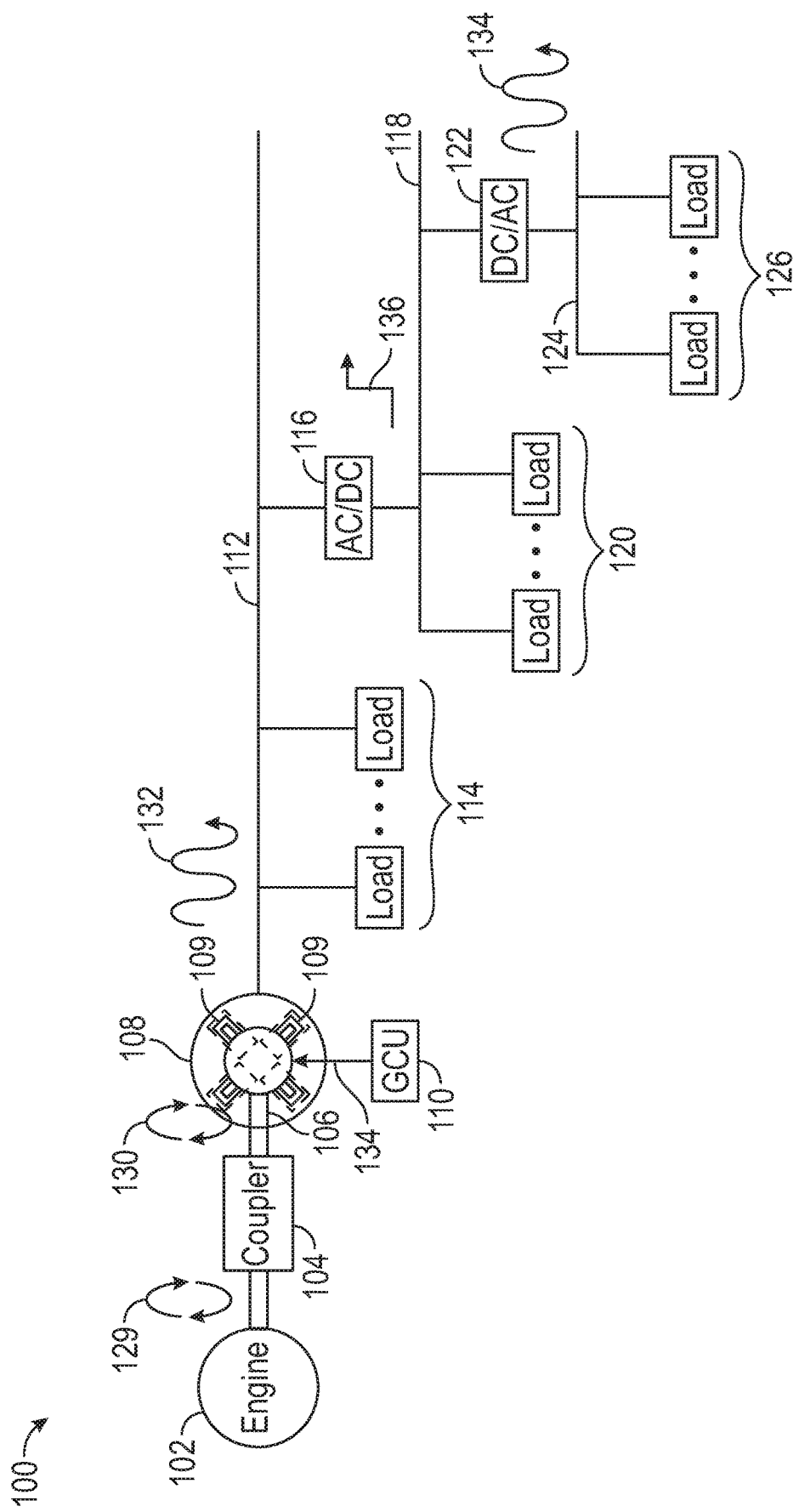
FIG. 1 is a block diagram of an example of an independent speed variable frequency (ISVF)-generator-based power system.

While the disclosure is susceptible to various modifications and alternative forms, specific examples have been shown in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1, an independent speed variable frequency (ISVF)-generator-based power system 100 is depicted. As described herein, the system 100 may be configured to generate and distribute power within a frequency band that, for a given range of shaft speeds, is narrower than would be generated using a typical induction generator without a constant speed drive device or other type of transmission device.

The system 100 may include a prime mover 102. For example, the prime mover 102 may be an aircraft engine or another type of vehicle engine. The prime mover 102 may be attached to a coupler 104. The coupler 104 may include a fixed gear ratio coupler, a belt coupler, or a combination thereof, and may be configured to convert torque 129 from the prime mover 102 to torque 130 on a shaft 106. The coupler 104 may differ from a constant speed device in that the torque transfer ratios of the coupler 104 may be fixed, rather than variable. The shaft 106 may be attached to an ISVF generator 108. By using an ISVF generator 108 instead of a typical induction generator, the system 100 may omit any constant speed drive device between the prime mover 102 and the shaft 106.

The ISVF generator 108 may be configured to convert torque 130 from the shaft 106 to an AC power signal 132. The ISVF generator 108 may generate the AC power signal 132 such that a frequency of the AC power signal 132 is independent of a shaft speed of the shaft 106. An example of an ISVF generator 108 usable with the system 100 is described further in U.S. patent application Ser. No. 15/819,919, filed on Nov. 21, 2017, published as U.S. Patent App. Publication No. 2019/0158002, and entitled "Independent Speed Variable Frequency Alternating Current Generator," the contents of which are hereby incorporated by reference in their entirety.

The ISVF generator 108 may have one or more pole pairs 109. FIG. 1 depicts the ISVF generator 108 as having two pole pairs 109 (i.e., four poles). However, more or fewer than two pole pairs are possible and consistent with the disclosure. The number of pole pairs 109 may act as a multiplier between a frequency of the shaft 106 and a frequency of the AC power signal 132. As such, the shaft 106 may be associated with an equivalent shaft frequency that equals a shaft frequency of the shaft 106 multiplied by the number of pole pairs 109.

The system 100 may include a generator control unit (GCU) 110. The generator control unit 110 may be configured to generate an excitation signal 134 to control the ISVF generator 108. The excitation signal 134 may be used by the ISVF generator 108 to generate a rotating magnetic flux at a rotor of the ISVF generator 108, resulting in a frequency of the AC power signal 132 being an algebraic sum of the frequency of the shaft 106 and a frequency of the excitation signal 134. The number of pole pairs 109 of the ISVF generator 108 may also affect the contribution of the excitation signal 134 to the AC power signal 132. Thus, an equivalent excitation frequency of the excitation signal 134 may equal an excitation frequency of the excitation signal 134 multiplied by the number of pole pairs 109.

The ISVF generator 108 may be coupled to an AC bus 112. A set of AC loads 114 may be coupled to and configured to receive power from the AC bus 112. The set of AC loads 114 may have operational requirements such that the set of AC loads 114 is adapted to operate within an operational frequency band having a lower frequency limit and an upper frequency limit. The operational frequency band may be narrower than an operating frequency band associated with the prime mover 102.

An AC/DC converter 116 may be coupled to the AC bus 112. The AC/DC converter 116 may be configured to convert the AC power signal 132 into a DC power signal 136 and to power a DC bus 118 using the DC power signal 136. A set of DC loads 120 may be coupled to the DC bus 118.

A direct-current to alternating-current (DC/AC) converter 122 may be coupled to the DC bus 118. The DC/AC converter 122 may be configured to convert the DC power signal 136 to a second AC power signal 134 to power a second AC bus 124. A set of AC loads 126 may be coupled to the second AC bus 124. The second set of AC loads 126 may have different operational frequency and voltage requirements than the set of AC loads 114. In some examples, the second set of AC loads 126 corresponds to motor loads, such as for actuating flight surfaces, etc.

During operation, the generator control unit 110 may be configured to control the ISVF generator 108 to generate the AC power signal 132 to fall within a frequency band, having a lower frequency limit and an upper frequency limit, that, for a given range of shaft speeds, is narrower than would be generated using a typical induction generator. In a first configuration, in order to achieve the frequency band, the generator control unit 110 may be configured to set a generator output frequency of the ISVF generator 108 equal to the lower frequency limit in response to the equivalent shaft frequency (e.g., the shaft frequency multiplied by the number of pole pairs 109) being less than the lower frequency limit. The generator control unit 110 may be configured to set the generator output frequency of the ISVF generator 108 equal to the upper frequency limit in response to the equivalent shaft frequency being greater than the upper frequency limit. In response to the equivalent shaft frequency being greater than or equal to the lower frequency limit and less than or equal to the upper frequency limit, the generator control unit 110 may be configured to set the generator output frequency of the ISVF generator 108 equal to the equivalent shaft frequency. In a second configuration, the generator control unit 110 may simply maintain a constant generator output frequency rather than narrowing the frequency band.

A benefit of the system 100 is that by using the ISVF generator 108 to narrow a frequency range of the AC power signal relative to a rotational frequency range of the shaft, the system 100 may omit complex, heavy, and/or bulky equipment, such as constant speed drive, between the shaft and the ISVF generator 108. A further benefit is that the generator control unit 110 may limit a generator output frequency to a constant generator output frequency that corresponds to operational requirements of the set of AC loads 114. Another benefit is that, in cases where the AC bus 112 may support a range of frequencies, by narrowing the generator output frequency 504 (shown in FIG. 5) to a range having a lower frequency limit and an upper frequency limit, the load equipment may be lighter and less complex due to a favorable operation condition of a narrow frequency band as described herein. Other benefits and advantages may exist.

Figure 2:
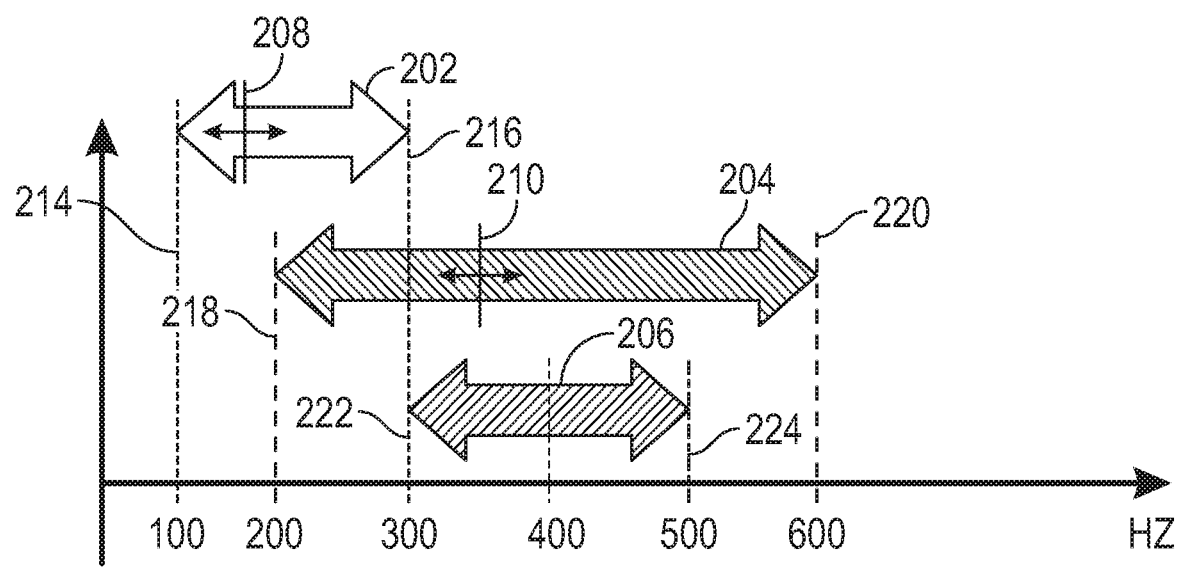
FIG. 2 is a graph that relates a shaft frequency band to an equivalent shaft frequency band and to an AC output signal frequency band.
Figure 3:
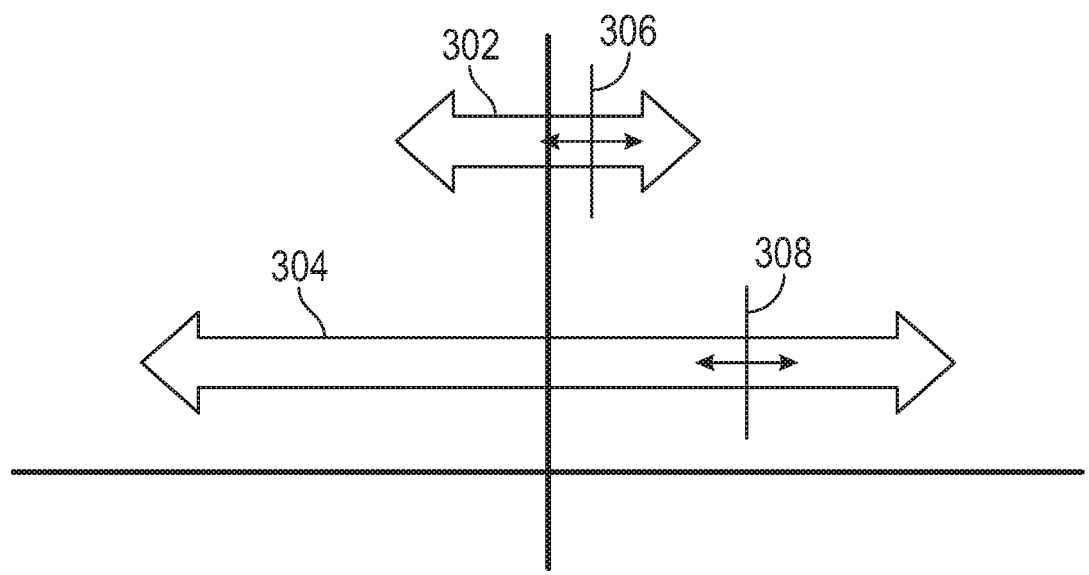
FIG. 3 is a graph that relates an excitation frequency band to an equivalent excitation frequency band.

FIGS. 2 and 3 describe the concept of an equivalent shaft frequency 210 and an equivalent excitation frequency 308. These frequencies depend on the number of pole pairs 109 associated with the ISVF generator 108. In cases where there is only one pole pair, the equivalent shaft frequency 210 and the equivalent excitation frequency 308 are equal to a shaft frequency 208 and an excitation frequency 306, respectively.

Referring to FIG. 2, a graph is depicted that relates a shaft frequency band 202 to an equivalent shaft frequency band 204 and to an AC output signal frequency band 206. As shown in FIG. 2, a shaft frequency 208 may fall within the shaft frequency band 202. The shaft frequency 208 may represent the frequency at which a prime mover (e.g., the prime mover 102) rotates a shaft (e.g., the shaft 106). The shaft frequency band 202 may be bounded between a lower shaft frequency limit 214, representing the lowest operational frequency at which the prime mover will rotate the shaft, and an upper shaft frequency limit 216, representing the highest operational frequency at which the prime mover will rotate the shaft. For illustrative purposes, FIG. 2 depicts the lower shaft frequency limit 214 as being 100 Hz and the upper shaft frequency limit 216 as being 300 Hz.

The equivalent shaft frequency band 204 may be equal to the number of pole pairs of an ISVF generator (e.g., the ISVF generator 108) multiplied by the shaft frequency band 202. In the example of FIG. 2, there may be two pole pairs such that if the shaft frequency 208 is about 175 Hz, then an equivalent shaft frequency 210 is about 350 Hz. Likewise, a lower equivalent shaft frequency limit 218 may be about 200 Hz and an upper equivalent shaft frequency limit 220 may be 600 Hz. Although, the example of FIG. 2 contemplates two pole pairs, any number of pole pairs may be used.

While a typical induction motor would ordinarily generate an AC power signal having a frequency that falls within the equivalent shaft frequency band 204, an ISVF generator (e.g., the ISVF generator 108) may be controlled through an excitation signal (e.g., the excitation signal 134) to generate the narrower AC output signal frequency band 206. For example, the AC output signal frequency band 206 may have a lower frequency limit 222 that is greater than the lower equivalent shaft frequency limit 218. Likewise, the AC output signal frequency band 206 may have an upper frequency limit 224 that is less than the upper equivalent shaft frequency limit 220. Thus, the AC output signal frequency band 206 may be limited to meet operational requirements of AC loads.

Referring to FIG. 3, a graph is depicted and relates an excitation frequency band 302 to an equivalent excitation frequency band 304. An excitation signal (e.g., the excitation signal 134) may be applied to the field windings on a rotor of an ISVF generator (e.g., the ISVF generator 108) to effectively increase or decrease a frequency of an output power signal. The excitation signal may have an excitation frequency 306 that falls within the excitation frequency band 302. Because the number of pole pairs associated with the ISVF generator affects the output frequency, the equivalent excitation frequency band 304 may be equal to the excitation frequency band 302 multiplied by the number of pole pairs. Likewise, an equivalent excitation frequency 308 may be equal to the excitation frequency 306 multiplied by the number of pole pairs.

In a single pole pair system, the generator output frequency may be the algebraic sum of the shaft frequency and the excitation frequency:

$$f_{Gen} = f_{Shaft} + f_{Excit}$$

For a system with multiple pole pairs, the shaft frequency and the excitation frequency may both be multiplied by the number of pole pairs (PP):

$$f_{Gen} = (f_{Shaft} + f_{Excit}) \cdot PP$$

where $f_{Shaft}*PP$ is the equivalent shaft frequency and $f_{Excit}*PP$ is the equivalent excitation frequency.

Figure 4:
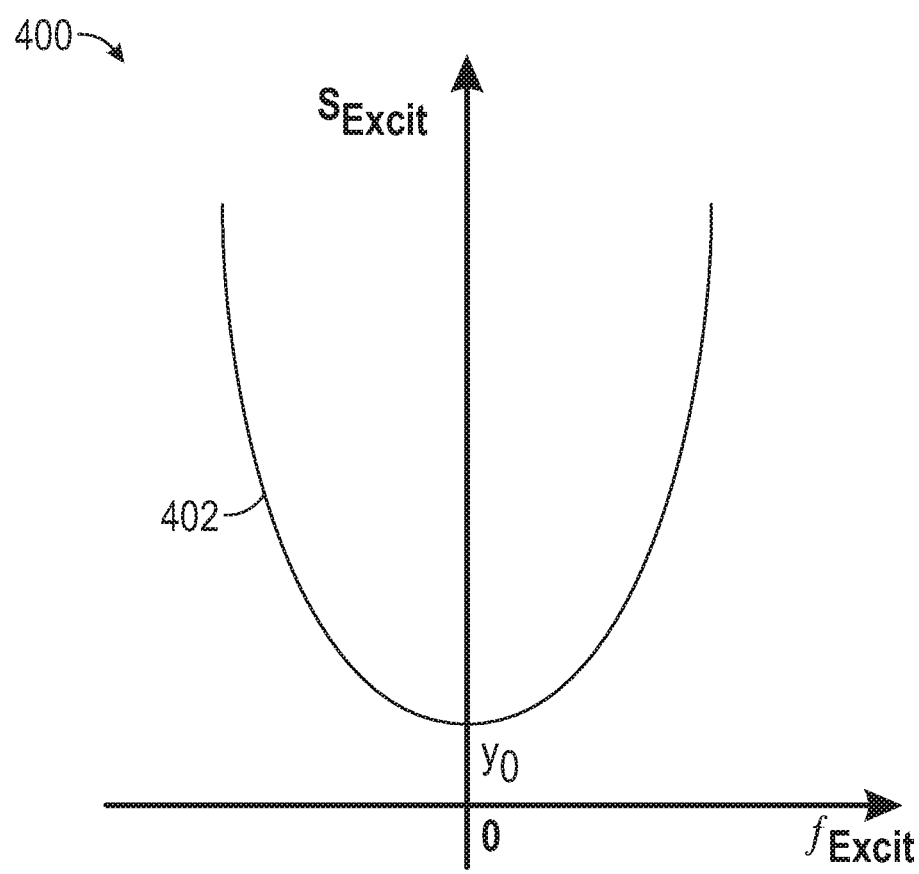
FIG. 4 is a graph that depicts a functional relationship between a power capacity requirement of an excitation signal and a frequency of the excitation signal.

Referring to FIG. 4, a graph 400 depicts a functional relationship 402 between power capacity requirement $S_{Excit}$ of an excitation signal and a frequency $f_{Excit}$ of the excitation signal. While the description in FIG. 4 may apply to a single pole pair system, the concepts may be expanded to multiple pole pairs as would be understood by persons of ordinary skill in the art, having the benefit of this application. As shown in the graph 400, as the frequency $f_{Excit}$ moves away from zero, the excitation signal may need more power $S_{Excit}$ in order to maintain a constant power output from an ISVF generator. Analysis shows that this relationship can be roughly represented by a conic section curve as shown. When an excitation frequency $f_{Excit}$ is zero, which means that the shaft speed is equal to the generator output frequency, the excitation signal need only provide sufficient power to compensate for power loss at rotor windings (e.g., $y_0$). The excitation frequency $f_{Excit}$ is positive when the generator shaft speed is lower than the generator output frequency. In this case, the excitation source provides an apparent power to the stator windings. The excitation frequency $f_{Excit}$ is negative when the generator shaft speed is higher than the generator output frequency. In this case, the excitation source sinks an apparent power from the generator shaft. The further the deviation (between excitation frequency $f_{Excit}$ and a generator rated output frequency) is, the higher the power capacity $S_{Excit}$ of excitation signal may be.

Figure 5:
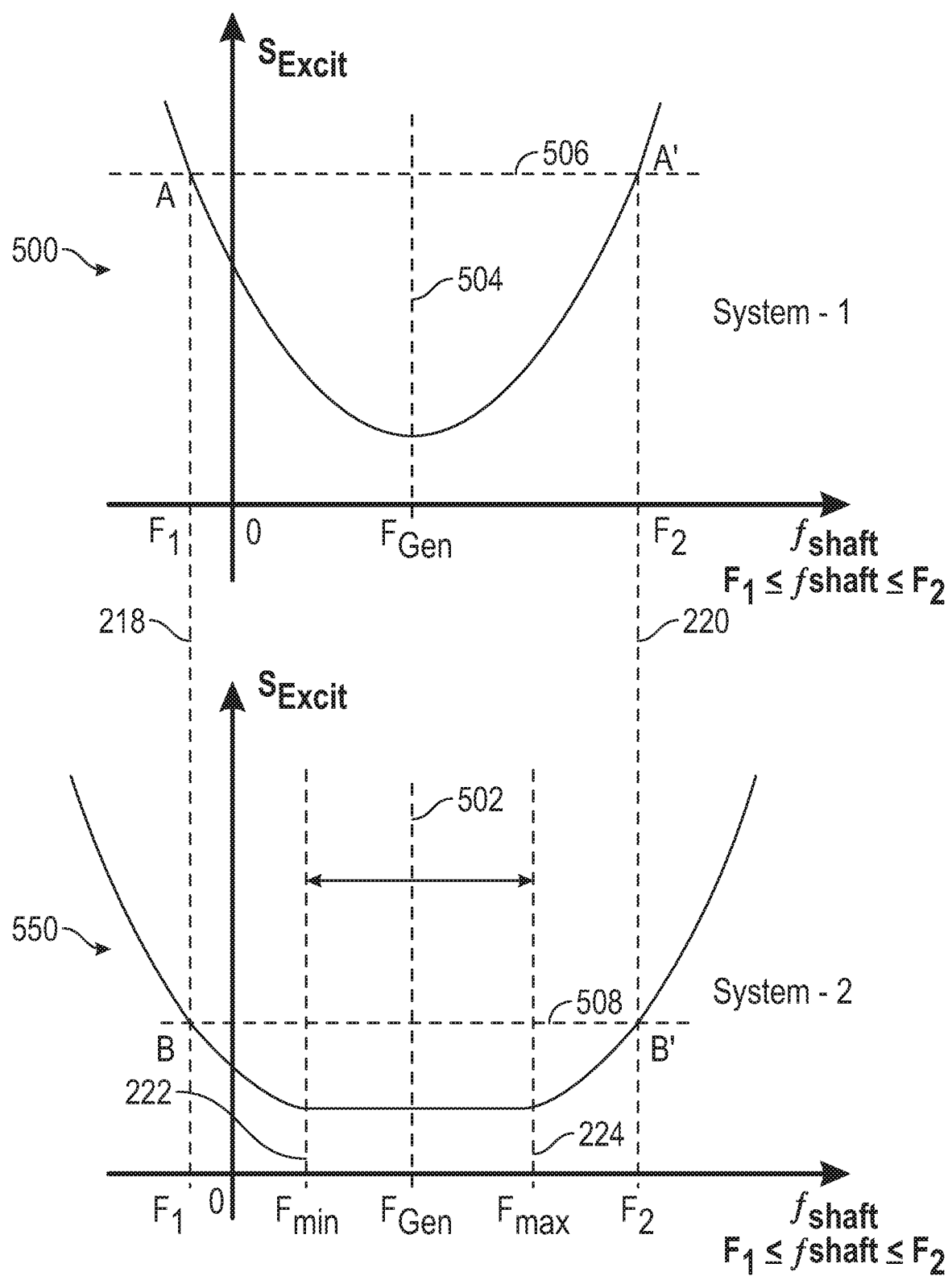
FIG. 5 is a set of graphs that compares power requirements associated with a first configuration of an ISVF-generator-based power system to a second configuration.

Referring to FIG. 5, a first graph 500 depicts power requirements associated with a first configuration of the system 100 and is compared to a second graph 550 depicting power requirements associated with a second configuration of the system 100. The first configuration may correspond to a constant frequency output and the second configuration may correspond to a narrowed frequency band output.

As shown in the first graph 500, a generator control unit (e.g., the generator control unit 110) may maintain a constant generator output frequency 504. This may be performed by setting the equivalent excitation frequency 308 equal to a difference between the constant generator output frequency 504 and the equivalent shaft frequency 210. In other words, the generator output frequency 504 may equal the algebraic sum of the shaft frequency 208 and the excitation frequency 306:

$$F_{Gen} = f_{Shaft}(t) + f_{Excit}(t)$$

In order to maintain a constant generator output frequency 504, the excitation frequency 306 may be set to zero when the shaft frequency 208 is equal to the generator output frequency 504, may be set to a positive value when the shaft frequency 208 is less than the generator output frequency 504, and may be set to a negative value when the shaft frequency 208 is greater than the generator output frequency 504:

if $f_{Shaft}(t) = F_{Gen}$, then $f_{Excit}(t) = 0$ if $f_{Shaft}(t) = F_{Gen}$, then $f_{Excit}(t) > 0$ if $f_{Shaft}(t) = F_{Gen}$, then $f_{Excit}(t) < 0$ When factoring in the pole pairs associated with an ISVF generator, the generator output frequency 504 may be determined as:

$$F_{Gen} = (f_{Shaft}(t) + f_{Excit}(t)) \cdot PP$$

In order to maintain a constant generator output frequency 504, the equivalent excitation frequency 308 may be set to zero when the equivalent shaft frequency 210 is equal to the generator output frequency 504, may be set to a positive value when the equivalent shaft frequency 210 is less than the generator output frequency 504, and may be set to a negative value when the equivalent shaft frequency 210 is greater than the generator output frequency 504:

if $(f_{Shaft}(t)) \cdot PP = F_{Gen}$, then $(f_{Excit}(t)) \cdot PP = 0$ if $(f_{Shaft}(t)) \cdot PP = F_{Gen}$, then $(f_{Excit}(t)) \cdot PP > 0$ if $(f_{Shaft}(t)) \cdot PP = F_{Gen}$, then $(f_{Excit}(t)) \cdot PP < 0$ As shown in the first graph 500, as the shaft frequency shifts away from the generator output frequency 504, more power is allocated to the excitation signal. In order to provide power for a range of frequencies between the lower equivalent shaft frequency limit 218 and the upper equivalent shaft frequency limit 220, a relatively high power 506 may be used. Thus, the constant generator output frequency configuration depicted in the first graph 500 may be appropriate when the range of shaft frequencies is relatively narrow. For engines that utilize a wider range of shaft frequencies, the configuration depicted in the second graph 550 may be more appropriate.

As shown in the second graph 550, a generator control unit (e.g., the generator control unit 110) may maintain a generator output frequency 502. Instead of being constant, the generator output frequency 502 may be held between a lower frequency limit 222 and an upper frequency limit 224:

$$F_{min} \leq F_{Gen} \leq F_{max}$$

If the shaft frequency 208 is between the lower frequency limit 222 and the upper frequency limit, then the generator output frequency 502 may be set equal to the shaft frequency 208 by setting the excitation frequency 306 of the excitation signal to zero. If the shaft frequency 208 is less than the lower frequency limit 222, then the generator output frequency 502 may be set equal to the lower frequency limit 222 by setting the excitation frequency 306 to a difference of the lower frequency limit 222 and the shaft frequency 208. If the shaft frequency 208 is greater than the upper frequency limit 224, then the generator output frequency 502 may be set equal to the upper frequency limit 224 by setting the excitation frequency 306 of the excitation signal equal to a difference of the upper frequency limit 224 and the shaft frequency 208:

if $F_{min} \leq f_{Shaft}(t) \leq F_{max}$, then $f_{Excit}(t) = 0$ if $f_{Shaft}(t) \leq F_{min}$, then $f_{Excit}(t) = F_{min} - f_{Shaft}(t)$ if $f_{Shaft}(t) \geq F_{max}$, then $f_{Excit}(t) = F_{max} - f_{Shaft}(t)$ When factoring in the pole pairs associated with an ISVF generator, if the equivalent shaft frequency 210 is between the lower frequency limit 222 and the upper frequency limit, then the generator output frequency 502 may be set equal to the equivalent shaft frequency 210 by setting the equivalent excitation frequency 308 of the excitation signal to zero. If the equivalent shaft frequency 210 is less than the lower frequency limit 222, then the generator output frequency 502 may be set equal to the lower frequency limit 222 by setting the equivalent excitation frequency 308 to a difference of the lower frequency limit 222 and the equivalent shaft frequency 210. If the equivalent shaft frequency 210 is greater than the upper frequency limit 224, then the generator output frequency 502 may be set equal to the upper frequency limit 224 by setting the equivalent excitation frequency 308 of the excitation signal equal to a difference of the upper frequency limit 224 and the equivalent shaft frequency 210:

if $F_{min} \leq (f_{Shaft}(t)) \cdot PP \leq F_{max}$, then $(f_{Excit}(t)) \cdot PP = 0$ if $(f_{Shaft}(t)) \cdot PP \leq F_{min}$, then $(f_{Excit}(t)) \cdot PP = F_{min} - (f_{Shaft}(t)) \cdot PP$ if $(f_{Shaft}(t)) \cdot PP \geq F_{max}$, then $(f_{Excit}(t)) \cdot PP = F_{max} - (f_{Shaft}(t)) \cdot PP$ As shown in the second graph 550, as the shaft frequency shifts away from the generator output frequency 502, more a constant level of power is allocated to the excitation signal while the shaft frequency is between the lower frequency limit 222 and the upper frequency limit 224. Thus, a relatively low power 508 may be used for the same range of shaft frequencies. The narrow band generator output frequency configuration depicted in the second graph 550 may be appropriate when the range of shaft frequencies is relatively broad and AC loads are able to operate with frequencies between the lower frequency limit 222 and the upper frequency limit 224.

Figure 6:
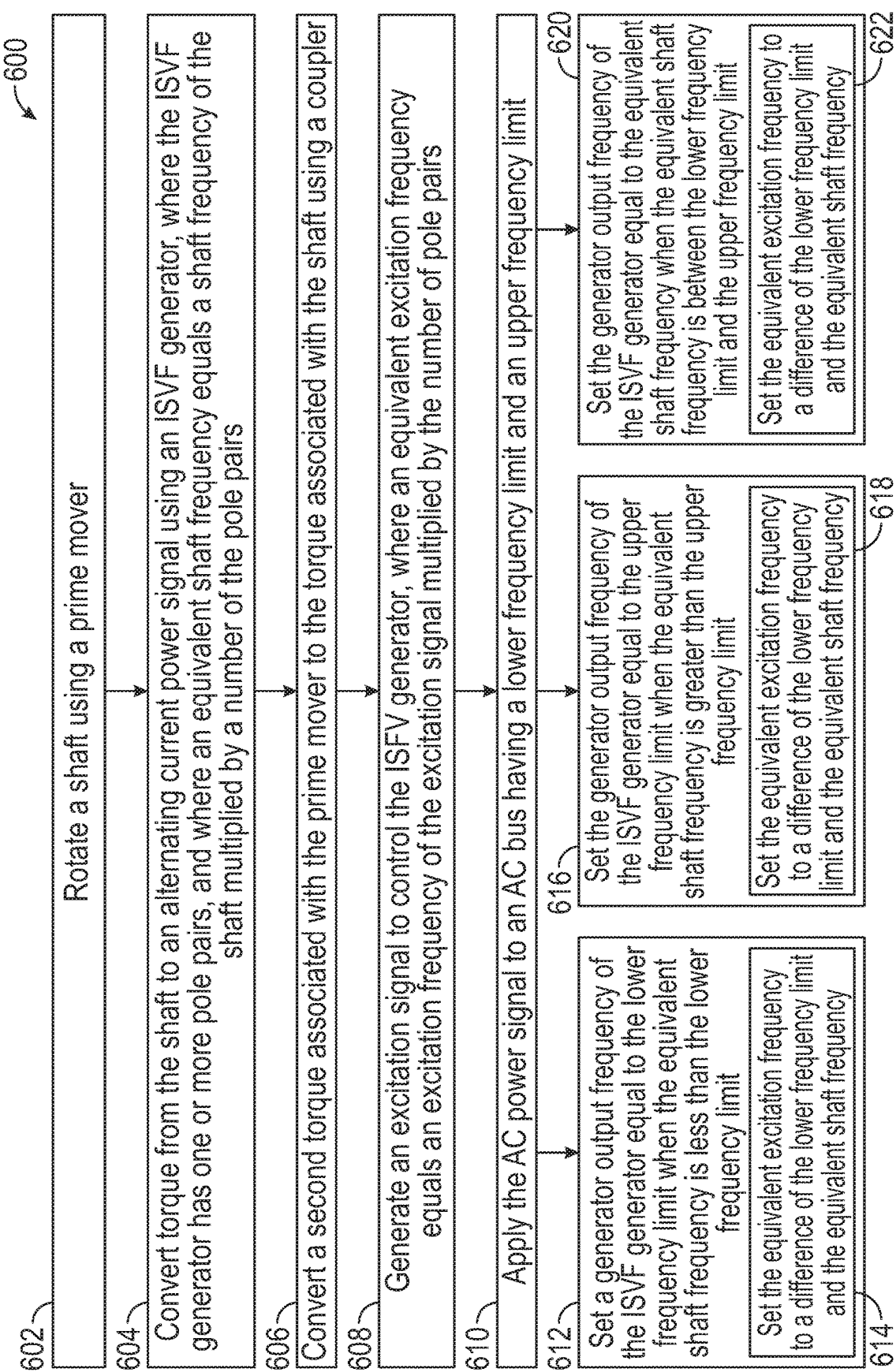
FIG. 6 is a flow chart depicting an example of a method for ISVF-generator-based power distribution.

Referring to FIG. 6, an example of a method 600 for ISVF-generator-based power distribution is depicted. The method 600 may include rotating a shaft using a prime mover, at 602. For example, the shaft 106 may be rotated using the prime mover 102.

The method 600 may further include converting torque from the shaft to an AC power signal using an ISVF generator, where the ISVF generator has one or more pole pairs, and where an equivalent shaft frequency equals a shaft frequency of the shaft multiplied by a number of the pole pairs, at 604. For example, the torque 130 from the shaft 106 may be converted to the AC power signal 132 using the ISVF generator 108.

The method 600 may also include converting a second torque associated with the prime mover to the torque associated with the shaft using a coupler, at 606. For example, the second torque 129 may be converted to the torque 130 using the coupler 104.

The method 600 may further include generating an excitation signal to control the ISVF generator, where an equivalent excitation frequency equals an excitation frequency of the excitation signal multiplied by the number of pole pairs, at 608. For example, the generator control unit 110 may generate the excitation signal 134.

The method 600 may also include applying the AC power signal to an AC bus having a lower frequency limit and an upper frequency limit, at 610. For example, the AC power signal 132 may be applied to the AC bus 112.

The method 600 may include setting a generator output frequency of the ISVF generator equal to the lower frequency limit when the equivalent shaft frequency is less than the lower frequency limit, at 612. Setting the generator output frequency of the ISVF generator equal to the lower frequency limit may include setting the equivalent excitation frequency to a difference of the lower frequency limit and the equivalent shaft frequency, at 614.

The method 600 may further include setting the generator output frequency of the ISVF generator equal to the upper frequency limit when the equivalent shaft frequency is greater than the upper frequency limit, at 616. Setting the generator output frequency equal to the upper frequency limit may include setting the equivalent excitation frequency of the excitation signal equal to a difference of the upper frequency limit and the equivalent shaft frequency, at 618.

The method 600 may include setting the generator output frequency of the ISVF generator equal to the equivalent shaft frequency when the equivalent shaft frequency is between the lower frequency limit and the upper frequency limit, at 620. Setting the generator output frequency equal to the equivalent shaft frequency comprises setting the equivalent excitation frequency of the excitation signal to zero, at 622.

A benefit of the method 600 is that by using an ISVF generator to narrow a frequency range of an AC power signal relative to a rotational frequency range of a shaft, complex, heavy, and/or bulky equipment, such as constant speed drive, may be omitted between the shaft and the ISVF generator. Other advantages may exist.

Although various examples have been shown and described, the present disclosure is not so limited and will be understood to include all such modifications and variations as would be apparent to one skilled in the art.

What is claimed is:

1. A system comprising:
a prime mover configured to rotate a shaft;
an independent speed variable frequency (ISVF) generator configured to convert torque from the shaft to an alternating current (AC) power signal, wherein the ISVF generator has one or more pole pairs, and wherein an equivalent shaft frequency equals a shaft frequency of the shaft multiplied by a number of the pole pairs;
an AC bus having a lower frequency limit and an upper frequency limit; and
a generator control unit configured to:
set a generator output frequency of the ISVF generator equal to the lower frequency limit when the equivalent shaft frequency is less than the lower frequency limit;
set the generator output frequency of the ISVF generator equal to the upper frequency limit when the equivalent shaft frequency is greater than the upper frequency limit; and
set the generator output frequency of the ISVF generator equal to the equivalent shaft frequency when the equivalent shaft frequency is greater than or equal to the lower frequency limit and less than or equal to the upper frequency limit.

2. The system of claim 1, wherein the generator control unit is configured to generate an excitation signal to control the ISVF generator, wherein an equivalent excitation frequency equals an excitation frequency of the excitation signal multiplied by the number of the pole pairs,
wherein setting the generator output frequency equal to the lower frequency limit comprises setting the equivalent excitation frequency to a difference of the lower frequency limit and the equivalent shaft frequency,
wherein setting the generator output frequency equal to the upper frequency limit comprises setting the equivalent excitation frequency of the excitation signal equal to a difference of the upper frequency limit and the equivalent shaft frequency, and
wherein setting the generator output frequency equal to the equivalent shaft frequency comprises setting the equivalent excitation frequency of the excitation signal to zero.

3. The system of claim 1, further comprising:
a coupler positioned between the prime mover and the shaft and configured to convert second torque associated with the prime mover to the torque associated with the shaft.

4. The system of claim 3, wherein the coupler includes a fixed ratio gear coupling, a belt, or a combination thereof.

5. The system of claim 1, wherein the prime mover is configured to rotate the shaft without any constant speed drive device coupled therebetween.

6. The system of claim 1, further comprising:
a set of AC loads electrically connected to the AC bus, wherein the lower frequency limit and the upper frequency limit are determined at least partially based on operational requirements of the set of AC loads.

7. The system of claim 1, further comprising:
an alternating-current-direct-current (AC/DC) converter electrically connected to the AC bus; and
a direct current (DC) bus electrically connected to the AC/DC converter, wherein the AC/DC converter is configured to convert the AC power signal on the AC bus to a DC power signal on the DC bus.

8. The system of claim 1, wherein the prime mover is an aircraft engine.

9. A method comprising:
rotating a shaft using a prime mover;
converting torque from the shaft to an alternating current power signal using an independent speed variable frequency (ISVF) generator, wherein the ISVF generator has one or more pole pairs, and wherein an equivalent shaft frequency equals a shaft frequency of the shaft multiplied by a number of the pole pairs;
applying the AC power signal to an AC bus having a lower frequency limit and an upper frequency limit;
setting a generator output frequency of the ISVF generator equal to the lower frequency limit when the equivalent shaft frequency is less than the lower frequency limit;
setting the generator output frequency of the ISVF generator equal to the upper frequency limit when the equivalent shaft frequency is greater than the upper frequency limit; and
setting the generator output frequency of the ISVF generator equal to the equivalent shaft frequency when the equivalent shaft frequency is between the lower frequency limit and the upper frequency limit.

10. The method of claim 9, further comprising:
generating an excitation signal to control the ISVF generator, wherein an equivalent excitation frequency equals an excitation frequency of the excitation signal multiplied by the number of the pole pairs,
wherein setting the generator output frequency equal to the lower frequency limit comprises setting the equivalent excitation frequency to a difference of the lower frequency limit and the equivalent shaft frequency,
wherein setting the generator output frequency equal to the upper frequency limit comprises setting the equivalent excitation frequency of the excitation signal equal to a difference of the upper frequency limit and the equivalent shaft frequency, and
wherein setting the generator output frequency equal to the equivalent shaft frequency comprises setting the equivalent excitation frequency of the excitation signal to zero.

11. The method of claim 9, further comprising:
converting second torque associated with the prime mover to the torque associated with the shaft using a coupler.

12. The method of claim 11, wherein the coupler includes a fixed ratio gear coupling, a belt, or a combination thereof.

13. The method of claim 9, wherein rotating the shaft is performed without any constant speed drive device coupled between the shaft and the prime mover.

14. The method of claim 9, wherein an alternating-current-direct-current (AC/DC) converter is electrically connected to the AC bus, and wherein a direct current (DC) bus is electrically connected to the AC/DC converter, the method further comprising:
converting, at the AC/DC converter, the AC power signal on the AC bus to a DC power signal on the DC bus.

15. The method of claim 9, wherein the prime mover is an aircraft engine.

16. A system comprising:
a prime mover configured to rotate a shaft;
an independent speed variable frequency (ISVF) generator configured to convert torque from the shaft to an alternating current (AC) power signal, wherein the ISVF generator has one or more pole pairs, and wherein an equivalent shaft frequency equals a shaft frequency of the shaft multiplied by a number of the pole pairs;
an AC bus; and
a generator control unit configured to generate an excitation signal to control the ISVF generator, wherein an equivalent excitation frequency equals an excitation frequency of the excitation signal multiplied by the number of the pole pairs, and wherein generating the excitation signal comprises:
setting the equivalent excitation frequency to a difference of the lower frequency limit and the equivalent shaft frequency when the equivalent shaft frequency is less than the lower frequency limit;
set the generator output frequency of the ISVF generator equal to the upper frequency limit when the equivalent shaft frequency is greater than the upper frequency limit; and
setting the equivalent excitation frequency of the excitation signal equal to a difference of the upper frequency limit and the equivalent shaft frequency when the equivalent shaft frequency is greater than or equal to the lower frequency limit and less than or equal to the upper frequency limit.

17. The system of claim 16, further comprising:
a coupler positioned between the prime mover and the shaft and configured to convert second torque associated with the prime mover to the torque associated with the shaft, wherein the coupler includes a fixed ratio gear coupling, a belt, or a combination thereof.

18. The system of claim 16, wherein the prime mover is configured to rotate the shaft without any constant speed drive device coupled therebetween.

19. The system of claim 16, further comprising:
a set of AC loads electrically connected to the AC bus, wherein the constant generator output frequency is determined at least partially based on operational requirements of the set of AC loads.

20. The system of claim 16, further comprising:
an alternating-current-direct-current (AC/DC) converter electrically connected to the AC bus; and
a direct current (DC) bus electrically connected to the AC/DC converter, wherein the AC/DC converter is configured to convert the AC power signal on the AC bus to a DC power signal on the DC bus.

* * * * *